Sept. 7, 1965  S. P. BECKER  3,205,300
CABLE GRIPPING UNIT
Filed May 15, 1964  4 Sheets-Sheet 1
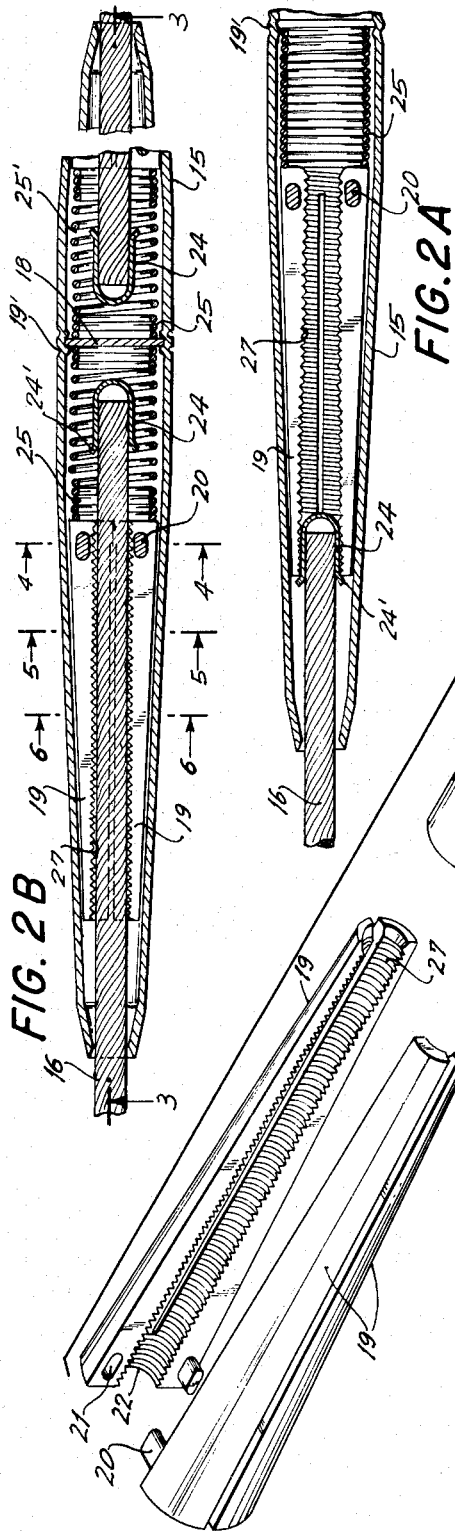
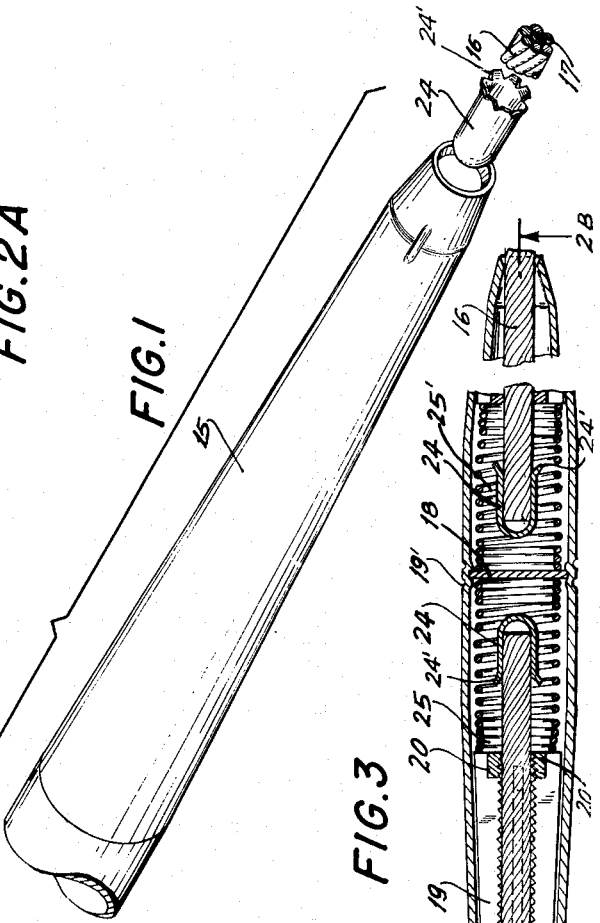
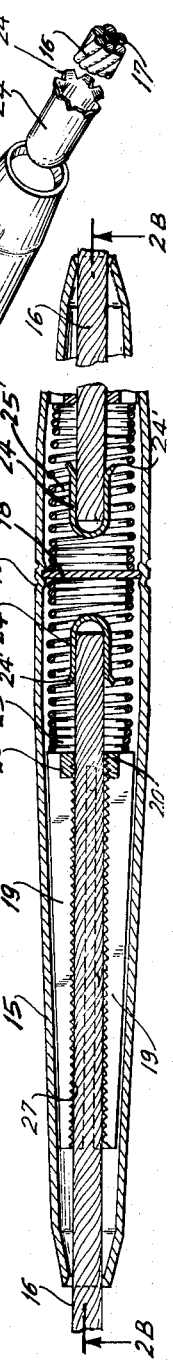
INVENTOR.
STEPHEN P. BECKER
BY
Kane, Dalsimer and Kane
ATTORNEYS

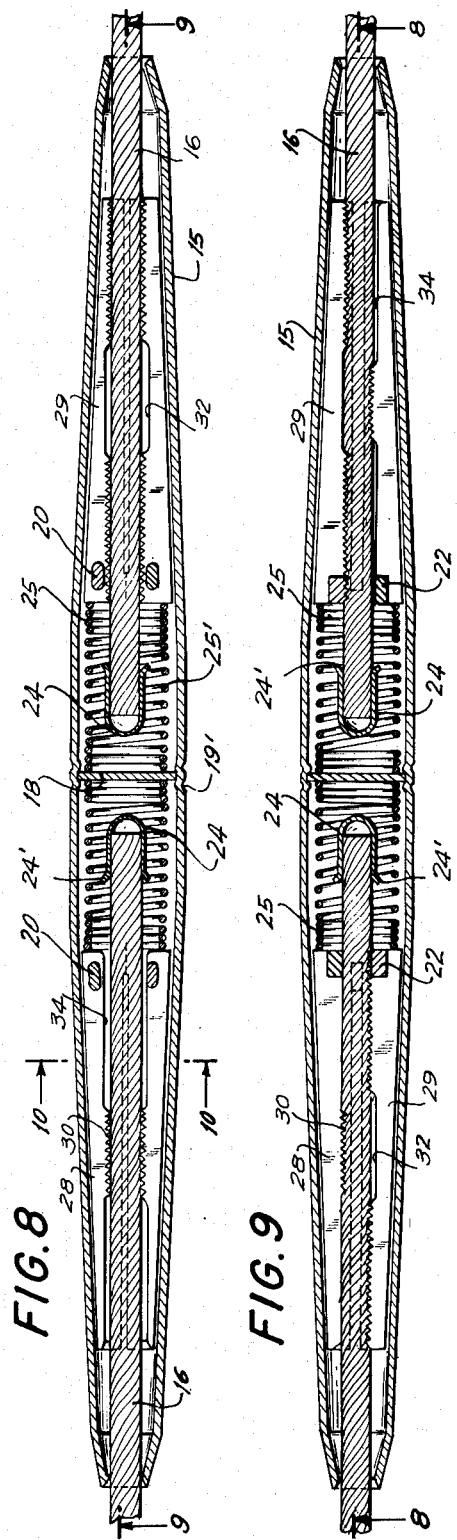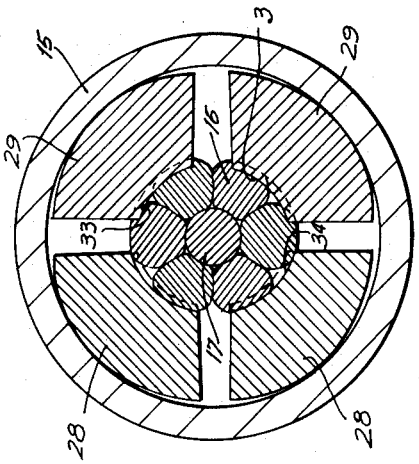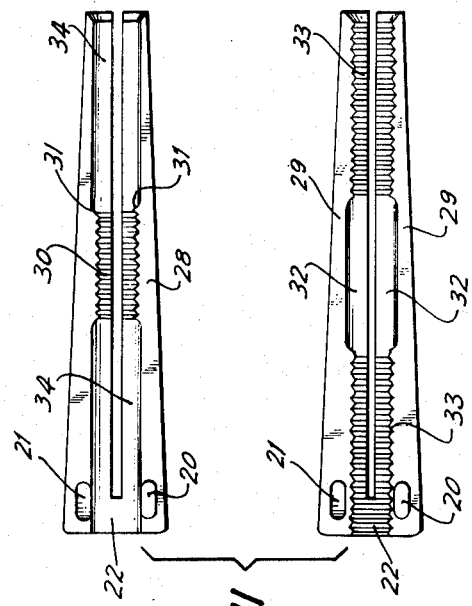
INVENTOR.
STEPHEN P. BECKER

Sept. 7, 1965
S. P. BECKER
3,205,300
CABLE GRIPPING UNIT
Filed May 15, 1964
4 Sheets-Sheet 4
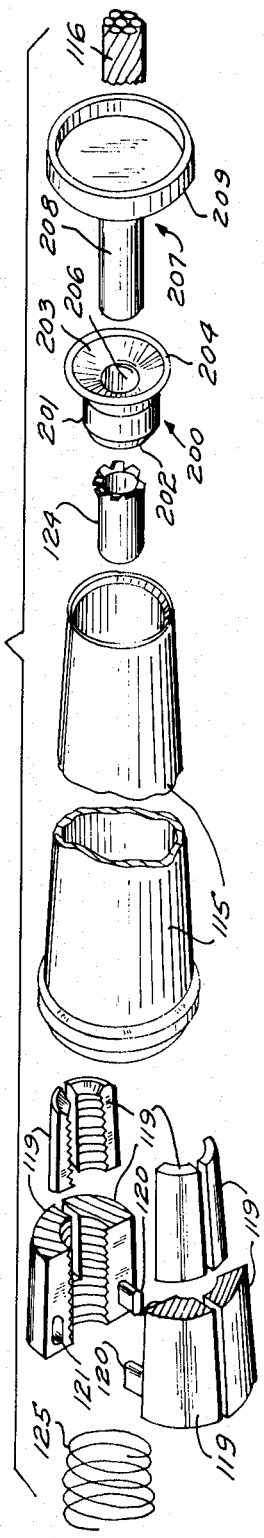
FIG. 12
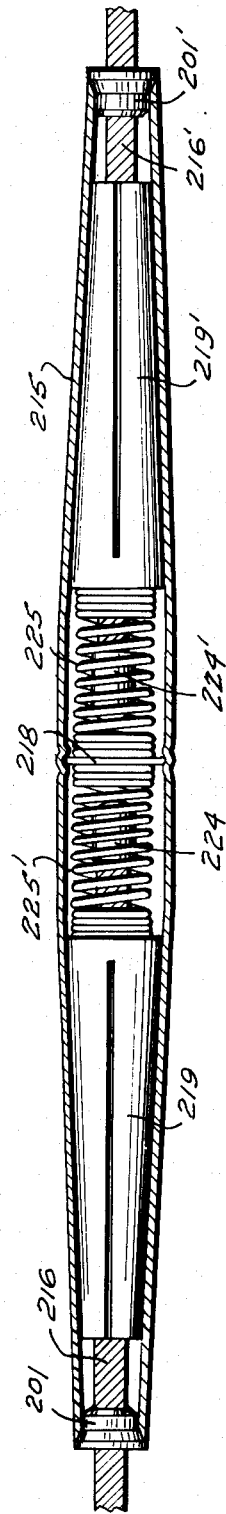
FIG. 15
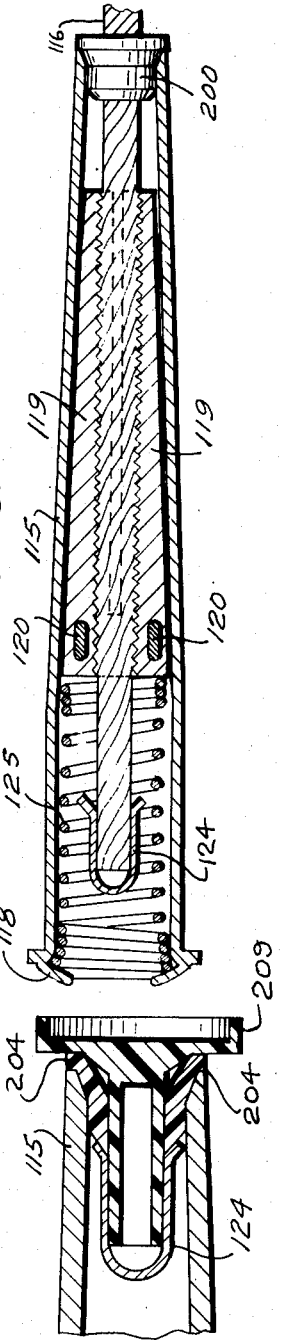
FIG. 14
FIG. 13
INVENTOR.
STEPHEN P. BECKER
BY
Kane, Dalsimer + Kane
ATTORNEYS United States Patent Office 3,205,300
Patented Sept. 7, 1965

3,205,300
CABLE GRIPPING UNIT
Stephen P. Becker, Poughkeepsie, N.Y., assignor to Fargo Mfg. Company, Inc., Poughkeepsie, N.Y., a corporation of New York
Filed May 15, 1964, Ser. No. 367,925
5 Claims. (Cl. 174—84)

This application is a continuation-in-part of my prior copending application for United States Letters Patent entitled, "Cable Gripping Unit" which was filed January 29, 1963, and which bears Serial No. 254,756, now abandoned.

This invention relates to a cable gripping unit and especially to a cable gripping unit of the type known as "line splicer" or "dead end."

It is a primary object of the invention to furnish an improved and more economical structure than that disclosed in my prior United States Patent No. 2,535,623 of December 26, 1950 entitled, "Wire Gripping Assembly and Casing Connector."

It is a further object of this invention to provide in a cable gripping unit of the type shown and described an aligning and guide means for the cable to be inserted therein.

While the present teachings may be advantageously employed in connection with electrical cables and conductors of various types the improved structure will serve to efficiently grip cables involving an annulus of aluminum or similar conductor strands and a central reinforcing or strain resisting strand formed of steel. Cables of this type are commonly known under the title of ACSR. Difficulties have been encountered with respect to conductors of this type in that if too great a strain is imposed on the strands embraced in the annulus those strands will shear. To prevent this, pressures should be exerted by the connecting or gripping unit which will result in the strains being primarily imposed on the central steel core or strand.

Therefore, where used in association with cables of this type it is a further object of the invention to grip the conductor in a manner such that the tension on the cable will be largely carried by the central steel core or strand to thus prevent shearing strains on the strand annulus of aluminum or equivalent cable strands. At the same time electrical losses will be minimized in that proper contact will be maintained between the unit and a maximum area of the cable.

Still another object is that of providing a structure achieving the foregoing and which may be produced at a relatively nominal figure aside from the fact that its application to a cable or conductor will offer no difficulty and be quite in accordance with the usual technique as practiced by the linesman.

With these and other objects in mind, reference is had to the attached sheets of drawings illustrating practical embodiments of the invention and in which:

FIG. 1 is an exploded perspective view of certain of the parts embraced in the improved gripping unit;

FIG. 2A is a fragmentary sectional side view thereof taken along the line 2B—2B in the direction of the arrows as indicated in FIG. 3 but showing the cable only partially inserted in the gripping unit;

FIG. 2B is a fragmentary sectional side view thereof taken along the line 2B—2B in the direction of the arrows as indicated in FIG. 3, showing such cable fully inserted in the gripping unit;

FIG. 3 is a view similar to FIG. 2 but taken along the line 3—3 and in the direction of the arrows as indicated in the latter figure;

Figure 4:
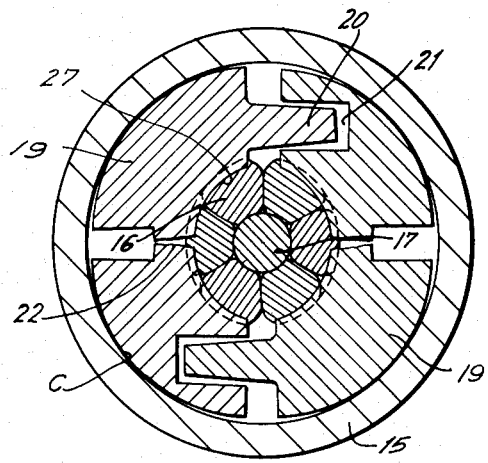
Figure 5:
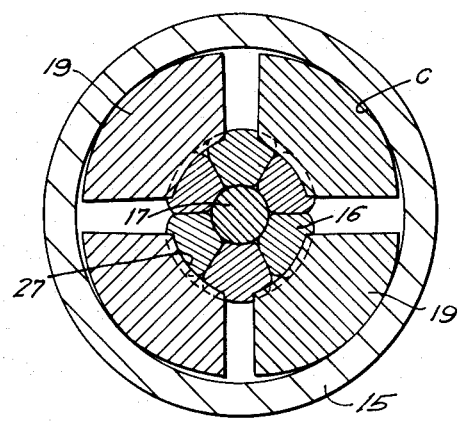
Figure 7:
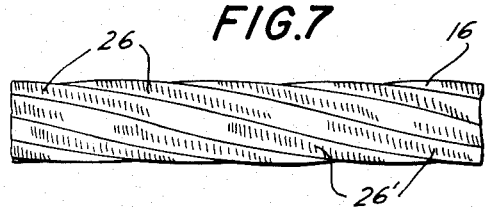
Figure 6:
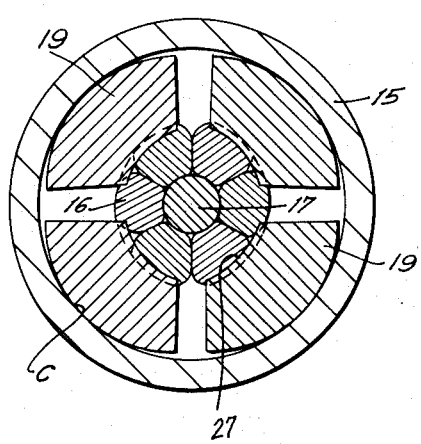

FIGS. 4, 5 and 6 are enlarged transverse sectional views taken respectively along the lines 4—4, 5—5 and 6—6, in the direction of the arrows as indicated in FIG. 2;

FIG. 7 is a fragmentary side elevation of a cable or conductor which has been gripped by the unit;

FIG. 8 is a view similar to FIG. 2 but showing an alternative form of structure taken along the line 8—8 and in the direction of the arrows as indicated in FIG. 9;

FIG. 9 is a view similar to FIG. 8 but taken along the line 9—9 and in the direction of the arrows as indicated in the latter figure;

FIG. 10 is an enlarged transverse sectional view taken along the line 10—10 in the direction of the arrows as indicated in FIG. 8;

FIG. 11 is a face view of the jaws as embodied in the assemblies of FIGS. 8 to 10 inclusive;

FIG. 12 is an exploded perspective view of the gripping unit with the guiding and aligning means shown;

FIG. 13 is a segmentary view of the end of the unit shown in FIG. 12 with the guiding and aligning means disposed therein;

FIG. 14 is a fragmentary sectional side view of the unit shown in FIG. 12 with the cable fully inserted in the gripping unit; and FIG. 15 is a view similar to FIG. 9 illustrating the guide means in position.

Throughout the drawings the invention has been illustrated in connection with a line splice device. In other words, a gripping unit or connector coupling adjacent cable ends to each other. This, however, is to be taken in an illustrative rather than a limiting sense in that the invention is equally applicable to dead end devices which grip merely one end of the transmission cable in order to anchor the same.

Thus, as in my prior patent a casing or shell is provided and which tapers in the direction of its opposite ends, the shell housing and cooperating with the elements of the cable-gripping assembly. This shell is identified under the reference numeral 15 in the several views and is formed of metal or other suitable material. A cable or cables to be gripped and involving an annulus of strands 16 of aluminum, copper or functionally equivalent metal has likewise been shown in the several views and within which annulus a central core strand 17 of steel or other metal having high tensile strength is enclosed. Having in mind that a line splice unit has been illustrated it is preferred that the casing or shell 15 be provided with a central partition 18 which is conveniently maintained in place by crimping the shell as at 19'. To each side of this partition gripping assemblies are disposed.

The main part of those asemblies as shown primarily in FIG. 1 involve an annulus of individual jaws 19. While in theory a minimum of three jaws might be employed to achieve the desired results and similarly five or more jaws might be employed for this purpose, it is preferred to utilize four jaws. These jaws are coupled to each other to prevent relative axial movements of the jaws with respect to each other when within the casing.

Such coupling may take the form of a lug 20 projecting from one jaw and slidably received within the socket 21 of a second jaw. Jaws providing such lugs or projections and sockets are interconnected by, for example, integral portions 22 (see for example FIGS. 1 and 4). Those portions are limited to a reduced section or area adjacent the larger ends of the jaw assemblies and are of adequate strength to assure the maintenance of a desired relationship between adjacent jaws during assembly, shipment, storage and the initial stages of the application of the unit to a cable or conductor. The same, of course, is true of the connections established by the couplings involving the lugs or projections 20 and sockets or recesses 21.

Therefore, within the shell or casing 15 the jaws may shift axially in the form of an annular gripping unit. As is apparent, it will usually be preferable to have the series of jaws embrace four elements. They are urged in an outward direction by means of springs interposed between the larger or base portions and the partition member 18. The springs are of the coil type and conveniently embrace central convolutions 25' which are relatively open or separated from each other and groups of end convolutions 25 disposed immediately adjacent each other. Accordingly, while the springs urge the jaws outwardly, they limit inward movement of those jaws when the edges of convolutions 25' are in contact with each other.

In cables of the ACSR type there always exists the danger that one of the annular series of strands 16 may spread or be diverted from the cable assembly as the end of the latter is introduced through the open end of a shell or casing 15. This is particularly true because of the ductile nature of these strands and the fact that as the cable is inserted into an open end of the shell or casing the strand ends may tend to migrate into the spaces between adjacent jaw edges and thus intereferre with the gripping operation which the user will subsequently endeavor to develop. To overcome this difficulty, flanged cups 24 are employed and initially disposed at the outer ends of shell 15 as shown in FIG. 1. It will be noted in this respect that the cups preferably have outwardly flared finger portions 24' at their outer edge which cause the cup to rest within the openings at the outer ends of the shell 15 to prevent them from freely entering therein. So disposed they will serve as closures to maintain the parts of the cable in substantially completely housed condition. The bore diameter of the cups is such that they may readily receive the end of a cable which end is thus ensleeved by them. Under a thrusting action of the cable in an inward direction the outwardly disposed finger portions 24' will be flexed inwardly and the cups will be unseated from their positions adjacent the ends of the shell and travel or project into the casing.

As shown in FIG. 2A cup 24 will come to rest at the outer end of the jaw opening where again the outwardly flared finger portions 24' will engage the outer edges of said jaws thus causing the entire jaw structure to move rearwardly compressing the spring 25. When the spring 25 is completely compressed as shown in FIG. 2A it will act as a stop to prevent further retraction of the jaw members. Accordingly, continued pressure on the cable 16 will cause the cup 24 with its finger portions 24' to be pushed further inwardly between the gripping surfaces of the jaws until the cup 24 comes to a stop against the central partition 18. Thereafter an outward pull on the cable will cause the gripper jaws to move away from their seated position as shown in FIG. 2A to the position shown in FIG. 2B.

It is noted that the collapsed length of spring 25 or 25' is greater than the length of the respective aluminum cup 24' or 24 so that the jaws will always grip the cable end inserted therein, thus assuring a firm grip on the conductor.

Each of the jaws 19 presents a gripping face 27 preferably provided with transversely extending teeth or ridges for gripping engagement with the elements of the cable. These faces at least at the time of manufacture and of assembly of the unit should involve a curvature developed along a greater radius than that which defines the exterior surface of the cable. This will be apparent from a review of FIGS. 4, 5 and 6. Also as is obvious in these figures the exterior faces of the jaws presents transverse curvatures involving in each instance a lesser radius than that involving the inner face of shell 15. Accordingly, as indicated at C in these figures with the cable in position between the jaws the latter will engage the inner shell face along a definite contact line or zone extending axially of the shell. This will be true of each of the four jaws as illustrated. Also, their gripping faces 27 will engage the cable along a similar line or zone extending axially of the latter and substantially midway of the side edges of each jaw.

As above described, such disposition of the parts, of course follows as a consequence of introducing a cable end into the cup maintained or mounted by the shell adjacent its open end and exerting an inward thrust upon the cable. Under these circumstances the cup 24 will wipingly engage the gripping faces of all jaws and tend to spread them apart to expand the assembly. Such spreading will be achieved because under frictional contact with the cup and cable the jaws will move inwardly of the shell against the pressure exerted by the spring thrusting against the back edge of the jaws 19 and the fact that both the jaws and shell are flared in the direction of thrust. When the cable has been fully inserted cup 24 will be within the enclosure defined by the adjacent spring. As now the thrust on the cable is relieved and the latter moves outwardly with respect to the shell, the jaws 19 will travel with it in wedging engagement with the inner face of the shell.

Upon a sufficient tension being established, the contact pressure between the shell and jaws at points C will become so great that a pair of the jaws connected by the integral portion 22 will swing around the latter and these hinged portions may fracture, as indicated in FIG. 4. As will be understood in certain instances only distortion of the parts will occur. Under all conditions the relative swinging of the jaws must occur due to the compound outer radius presented by an adjacent pair of them and moving in contact with the bore surface of the shell. The play between extensions 22 and the faces of recesses 21 will be sufficiently great to permit of swinging movements of the adjacent jaws thus connected. Otherwise this coupling may also fracture or at least distort to an extent adequate to permit the swinging of the jaws with respect to each other. Therefore, under continued contraction of the annular assembly the contact face 27 of each jaw will by virtue of the teeth or serrations be pressed against the outer faces of strands 16 from one side edge of an individual jaw through to an opposite side edge thereof.

This will cause a distortion of the initially circular strands 16 so that they are in effect forced one into the other and have their inner edge zones which are in contact with the core 17 deformed to present a concave rather than a convex surface as clearly brought out in FIGS. 4 to 6. Accordingly an almost continuous contact zone will exist between the annular series of strands 16 and the outer face of the core strand. Accordingly a maximum frictional engagement will occur between these elements. Even under extreme conditions of tension a proper relationship of the elements will be established.

In other words, due to the effective contact areas which are established under the pressure conditions between the faces 27 and adjacent strands the latter will merely be flattened and in contact with substantially the entire area of each gripping face and will likewise be in substantially continuous contact with the surface of the central core strand. Therefore, within the permissible stretch limits of the cable elements, no shearing of the softer outer strands will occur and the tension strains will be transmitted to strand 17 which, within the specification limits of a given cable will safely carry the load. Simultaneously an excellent electrical connection will be maintained between all parts of the assembly whether a dead end or a line splice is involved.

If, as is preferred, the number of the jaws in the series be four, then the contact area between each jaw and a cable will involve almost 90°. If three jaws are embraced in the annular series then the contact areas between the gripping faces of the jaws and cable will in each instance be almost 120°, while if five or more jaws are used the arcs will be correspondingly decreased with respect to the gripping faces of the jaws. In this connection attention is invited to FIG. 7 which illustrates in side elevation a cable after the latter has been detached from the gripping unit and in which prior to such detachment a tension strain of considerable value has been imposed. As will be noted under 26 and 26' in this view the gripping zones created by a four jaw unit in each instance extend over substantially 90° of the cable circumference, exposure being of course limited to the faces of the spirally disposed strands which are in positions to be engaged by the gripping faces 27.

In certain instances it might be desirable to aixally offset a portion of the cable within the zone of gripping.

Thus in FIGS. 8 through 10 reference numerals as heretofore employed in connection with substantially identical parts again designate all elements of the assembly with the exception of the jaws. The latter are four in number, one pair being indicated by the numeral 28 and the other by 29. The former each present gripping faces 30 formed on the exposed surface of pedestal portion 31. Those portions project inwardly in a complete assembly to engage with the cable and for this purpose their faces are serrated, formed with teeth or corrugated as in the case of faces 27. Pairs of jaws 29 are provided with a central recess 32 of an area such that the pedestal portion 31 may be accommodated therein. Beyond this recess relatively raised or pedestal portions 33 also have their working faces of a nature such that they will efficiently grip a cable. Portions 33 extend in the zones of relatively recessed parts 34 included in jaws 28 beyond and short of pedestal portion 31.

All of the factors heretofore traversed in connection with the gripping operation of a cable will occur so that the latter will be efficiently held. If desired, it is apparent that the faces of recesses 32 and 34 might be roughened, provided with teeth or otherwise designed to assure the presence of gripping elements around substantially the entire circumference of a gripping cable. Additionally, however, the cable will be axially offset as especially shown in FIGS. 9 and 10 or in other words, "kinked" throughout at least one zone to thus further assure against axial movements of the parts.

In FIGS. 12 through 15 there are illustrated gripping units of the type previously described wherein the aligning and guide means heretofore specified are included. Hence in FIGS. 12 through 14 shell 115 encloses jaws 119 coupled, for example, by lugs 120 and sockets 121 and the jaws are urged in an outward direction by means of spring 125 interposed between the larger or base portion of the jaw and the end 118 of the shell 115.

Guide means 200 is a plastic, or other non-conducting material, member having a substantially cylindrical body portion 201, a chamfered end 202 and a funnelled end 203 provided with a flange 204. Bore 206 having a diameter capable of passing cable 116 therethrough is provided in member 200 so that when the guide means 200 is mounted by a press fit at the open end of shell 115, the outside diameter of body 201 of guide means 200 being substantially equal to the inside diameter of shell 115 at the open end, the bore 206 aligns with the opening provided in cup 124. Flange 204 of guide means 200 embraces the end of shell 115.

The guide means with its funnel-like opening and chamfered end is disposed therefore with the flange 204 embracing the end of shell 115 and chamfered end 202 adjacent cup 124. Since the guide means 200 is formed of a non-conducting material, as the end of cable 116 is inserted within the assembly it cannot touch the end of shell 115 because of flange 204 and it is readily guided within bore 206 by funnel end 203 which bore being aligned with the bore of cup 124 readily guides the cable end into cup 124. The remaining components of the assembly shown in FIGS. 12 through 14 function in exactly the same manner as the identical components do in the preceding embodiments described above. It is noted, however, that with the utilization of guide means 200 the cable can be readily inserted with its end in the bore of cup 124 without the necessity of exceptional care being taken to avoid touching the cable against an electrically conductive member. This is also extremely useful in view of the fact that the cup 124 in practical situations is not always properly aligned with the open end of shell 115 creating difficulties in insertion of cable end 116.

An additional problem remains in such an assembly, and that is the further difficulty of preventing the cup 124 from becoming completely disaligned with the opening in shell 115 and the bore of guide means 200. In order to protect against such misalignment which occurs primarily in shipment and handling of the cable gripping member, aligning means 207 is provided consisting of a cylindrical member 208 having an outside diameter substantially equal to that of the inside diameter bore 206 and the inside diameter of the bore in cup 124 which under most circumstances is also substantially equal to the outside diameter of cable 116. The aligning means 207 is provided with a circular grip portion 209 having an outside diameter greater than the outside diameter of the end of shell 115. The aligning means is also formed of a plastic or non-conducting material, although this is not absolutely necessary.

The aligning means is used by insertion of cylindrical end 208 within bore 206 of guide means 200 and the bore of cup 124 by the gripping of grip portion 209 maintaining the cup 124 in alignment with the bore 206 and the end of shell 115 during handling of the gripping unit. When it is desired to use the unit the user merely withdraws aligning means 207 by gripping grip portion 209 and withdrawing the aligning means from the assembly.

In FIG. 15 an alternate form of structure is shown in which the numeral 215 designates the shell, 225 and 225' designates springs supported by wall 218 and which yieldingly urge jaws 219 and 219' towards respective openings in shell 215 which openings support guide means 201 and 201' respectively through which pass the ends of cables 216 and 216' respectively which have ends inserted within cups 224 and 224' respectively.

The embodiment shown in FIG. 15 functions in the same manner as the embodiment shown in FIGS. 12 through 14.

From the foregoing it is apparent that among others the several objects of the invention as specifically aforenoted are achieved. Obviously numerous changes in construction and rearrangement of the elements might be resorted to without departing from the spirit of the invention as defined by the claims.

I claim:

1. In the combination of an electrical cable and a gripping unit comprising a shell having a conical bore terminating at its outer end in a cable-accommodating opening, a series of jaws each axially tapered and somewhat arcuate in cross section, means movably connecting said jaws to provide a tapered, annular and constrictable cable-embracing member presenting on its inner face a corresponding series of surfaces to grip a cable disposed between said jaws, said shell presenting a tapered bore circular in cross section, said member being slidably disposed within said shell bore to ride on the surface of the latter with its tapered end extending towards the reduced bore end, a helical spring thrusting against the opposite end of said member and the shell to urge the member towards the reduced end of said bore and thus cause said jaws to constrict around a cable embraced thereby, the outer faces of each individual jaw defining an arc less than the curvature of the bore face and means connecting an adjacent pair of said jaws maintaining the outer faces of the latter in contact with the bore face solely in a zone midway between their side edges, that improvement including a cable receiving cup positioned in the outer end of said shell bore, flexible positioning fingers carried by said cup member at its open end for initially locating said cup in said bore end opening but capable of yielding against inward pressure on said cable and cup to permit the entrance of said cup and cable within the shell bore and said fingers thereafter locating said cup at the forward end of the openings of said jaws so that continued inward pressure on said cable causes said jaw structure to move rearwardly against the pressure of said spring until the latter has been fully compressed and whereby continued pressure on said cable causes said cup fingers to again flex permitting said cup and cable to enter the bore between said gripping jaws and into the central bore of said compressed helical spring, said collapsed length of said spring being greater than the longitudinal dimension of said cup member.

2. A combination in accordance with claim 1 including non-conducting guide means disposed in said bore end opening, a central bore of said guide means substantially aligned with said cup member, said guide means being constructed and arranged to insulate said bore end opening and guide said cable through said bore end opening and into said cup member.

3. A combination in accordance with claim 2 in which said guide means comprises a substantially cylindrical body portion within said shell, said central bore extending longitudinally therethrough, a chamfer of said body portion abutting said cup fingers and a funnelled end terminating in a flange overlying said bore end opening, said funnelled end receiving said cable and guiding it into said central bore.

4. A combination in accordance with claim 2 in which aligning means are provided consisting of a cylindrical portion having an outside diameter substantially equal to the inside diameter of said central bore within said central bore and said cup member and a grip portion without said bore end opening having an outside diameter greater than the outside diameter of said shell end.

5. A combination in accordance with claim 4 in which the aligning means is formed of a non-conducting material.

References Cited by the Examiner
UNITED STATES PATENTS

| | | | |
|---|---|---|---|
| 1,854,783 | 4/32 | Cook | 24—126 |
| 2,966,653 | 12/60 | Jugle | 339—273 |

WILLIAM FELDMAN, *Primary Examiner.*